United States Patent
Barki (10) Patent No.: US 11,110,366 B2
(45) Date of Patent: Sep. 7, 2021

(54) COMPUTERIZED SYSTEM AND METHOD OF USING A PHYSICAL TOY CONSTRUCTION SET BY MULTIPLE USERS

(71) Applicant: PLAY PROPERTIES ENTERTAINMENT LTD., Tel-Aviv (IL)

(72) Inventor: Yaacov Barki, Tel-Aviv (IL)

(73) Assignee: PLAY PROPERTIES ENTERTAINMENT LTD., Tel Aviv (IL)

(*) Notice: Subject to any disclaimer, the term of this patent is extended or adjusted under 35 U.S.C. 154(b) by 163 days.

(21) Appl. No.: 16/086,617

(22) PCT Filed: Sep. 1, 2016

(86) PCT No.: PCT/IL2016/050954
§ 371 (c)(1),
(2) Date: Sep. 20, 2018

(87) PCT Pub. No.: WO2017/168404
PCT Pub. Date: Oct. 5, 2017

(65) Prior Publication Data
US 2019/0099686 A1    Apr. 4, 2019

Related U.S. Application Data

(60) Provisional application No. 62/314,434, filed on Mar. 29, 2016.

(51) Int. Cl.
*A63H 33/04* (2006.01)
*G06K 9/20* (2006.01)
(Continued)

(52) U.S. Cl.
CPC .......... *A63H 33/04* (2013.01); *G06K 9/2063* (2013.01); *A63F 13/335* (2014.09); *A63F 13/63* (2014.09);
(Continued)

(58) Field of Classification Search
CPC .... A63H 33/04; A63H 33/044; A63H 33/042; A63H 2200/00; A63F 9/0073
See application file for complete search history.

(56) References Cited

U.S. PATENT DOCUMENTS 8,292,744 B2    10/2012  Baszucki et al.
2006/0136180 A1* 6/2006  Hansen ................. G06Q 50/04
                                                   703/1

(Continued)

FOREIGN PATENT DOCUMENTS

EP        2714222 B1    4/2014

*Primary Examiner* — Eugene L Kim
*Assistant Examiner* — Alyssa M Hylinski
(74) *Attorney, Agent, or Firm* — Reches Patent (57) ABSTRACT

The subject matter discloses a method operated by a computerized central system comprises receiving information from a plurality of users operating a toy construction set comprises building blocks designed for building a structure, said information represents a building process of said structure; analyzing the information on the building process of said structure; generating a feedback on the building process of said structure; transmitting the feedback to electronic devices of the user building the structure. The subject matter also discloses generating a new model according to a plurality of models received from the plurality of users and a predefined set of rules, the new model is a computerized visual representation of a constructible object.

19 Claims, 7 Drawing Sheets

(51) Int. Cl.
*A63F 13/335* (2014.01)
*A63F 13/63* (2014.01)

(52) U.S. Cl.
CPC . *A63F 2300/407* (2013.01); *A63F 2300/6018* (2013.01); *A63F 2300/66* (2013.01); *A63H 2200/00* (2013.01); *G06K 2209/01* (2013.01)

(56) References Cited

U.S. PATENT DOCUMENTS

| | | | |
|---|---|---|---|
| 2010/0001923 A1* | 1/2010 | Zilber | A63F 13/22 345/1.1 |
| 2012/0025462 A1* | 2/2012 | Knowlton | G06T 11/60 273/157 R |
| 2012/0142429 A1* | 6/2012 | Muller | A63F 13/35 463/42 |
| 2012/0258436 A1* | 10/2012 | Lee | G09B 19/003 434/362 |
| 2014/0142900 A1* | 5/2014 | Andre | G06F 30/00 703/1 |
| 2015/0125835 A1* | 5/2015 | Wittich | A63F 3/0421 434/169 |
| 2016/0101370 A1* | 4/2016 | Madsen | A63F 3/04 446/91 |
| 2016/0210484 A1* | 7/2016 | Shi | G09B 5/06 |
| 2017/0173486 A1* | 6/2017 | Rothschild | A63H 33/086 |

* cited by examiner

COMPUTERIZED SYSTEM AND METHOD OF USING A PHYSICAL TOY CONSTRUCTION SET BY MULTIPLE USERS

CROSS-REFERENCE TO RELATED APPLICATIONS

This application is a U.S. National Phase Application under 35 U.S.C. 371 of International Application No. PCT/IL2016/050954, which has an international filing date of Sep. 1, 2016, and which claims priority and benefit from U.S. Provisional Patent Application No. 62/314,434, filed Mar. 29, 2016, the contents and disclosure of which are incorporated herein by reference in their entirety.

FIELD OF THE INVENTION

The present invention generally relates to a toy construction set.

BACKGROUND OF THE INVENTION

Toy construction sets comprise a number of interlocking building blocks have been played for many years in a self-contained fashion. In general, toy construction sets can fall into one of two types: Building block toys and hub and spoke toys. The building blocks have a distinctive configuration comprises protuberances and hollows on their surfaces utilized for interlocking the building blocks which enable a variety of buildings and structures to be formed. The spoke-hub toys comprise connections in forms of bars and wheels in which the bars can be connected to the hub at the center so multiple structures may be formed or joint together to form extended structures.

The numbers of the alternative constructions and the configurations in any of the options are large. In multiple cases today, the building processes of such construction sets are facilitated by guidelines, or instructions composed in order to help, guide, or sometime to lead the players. In some cases, guidelines or instructions are not used and the players utilize the construction sets to build structures as they please.

SUMMARY OF THE INVENTION

The present invention relates to toy construction sets used by a plurality of users and a system that manages and guides the building processes of the players as well as providing the ability of collaboration among the plurality of users. The plurality of users use the toy construction sets in multiple distinct locations, for example in different cities or countries. Said system is a computerized central system which provides an additional dimension to toy construction sets by enabling players' interconnections, idea sharing, co-creation of new constructions with a given construction set, fostering players during the building process, and managing relations among players. The method disclosed in the present invention may be based on the ability to detect specific building blocks which are used in a given built structure and share the information with other players. The ability to detect and share information by the computerized central system disclosed in the present invention can also be utilized to conclude the optimal content of construction sets in order to adjust the number and the types of the Building Blocks so future players may receive adequate content suitable for their purposes. The toy construction set is a physical element having physical building blocks configured to be connected by their physical structure or using mechanisms such as protrusions, bolts and the like.

it is an object of the subject matter to disclose a method operated by a computerized central system comprises receiving information from a plurality of users operating a toy construction set comprises building blocks designed for building a structure, said information represents a building process of said structure; analyzing the information on the building process of said structure; generating a feedback on the building process of said structure; transmitting the feedback to electronic devices of the users building the structure.

In some cases, the central system is utilized for managing said building processes. In some cases, repeating at least a portion of said method one or more times during said building process. In some cases, the building blocks of said construction-sets designed to be physically connected to a dedicated surface. In some cases, the feedback comprises guidelines required for building said structure. In some cases, the received information comprises image files. In some cases, the received information comprises electronic video files.

In some cases, the received information comprises data captured by Radio-frequency identification based processes. In some cases, said received information comprises data captured by Matrix Code based processes. In some cases, said received information comprises data captured by Barcode based processes. In some cases, analyzing said received information comprises identifying a progress status of said building process. In some cases, said building process comprises two or more phases. In some cases, the phases are specific and distinct parts of said building process. In some cases, analyzing said received information comprises identifying the completed phase of said building process.

In some cases, analyzing said received information comprises identifying the location of said building block on said structure and generating the feedback according to the identified location. In some cases, analyzing said received information comprises optical character recognition methods. In some cases, analyzing said received information comprises machine-readable representation based methods.

In some cases, analyzing said received information comprises identifying a player conducting said building process. In some cases, analyzing said received information comprises recognizing building patterns of individual players conducting said building process. In some cases, building patterns are preferences of individual players to start the building process with a particular section of said structure. In some cases, building patterns are preferences of individual players to start the building process with specific building blocks of said construction set. In some cases, building patterns are habits of individual players to conduct said building process faster than the average. In some cases, building patterns are habits of individual players to conduct said building process slower than the average.

In some cases, analyzing said received information comprises comparing the progress levels of multiple players. In some cases, the feedback comprises guidelines on how to continue with the building process. In some cases, the feedback is related to a progress level of the users and to a specific structure formed by a player until the point of receiving said information. In some cases, the feedback comprises construction alternatives. In some cases, the feedback comprises details on height or/and the width of the built structure. In some cases, the feedback is provided to individual users according to the users' chosen format.

In some cases, the users' chosen format is a text format. In some cases, the users' chosen format is a digital video format. In some cases, the users' chosen format is an audio format.

In some cases, the feedback is provided to the users at any point of time said central system chooses during said building process. In some cases, the feedback is provided to the users at the beginning of said building process. In some cases, the feedback is provided to the players at the end of said building process. In some cases, the feedback further comprises links between users according to their expertise levels. In some cases, the feedback further comprises collaboration activities for interaction among said users. In some cases, the collaboration activities further comprise video conference methods. In some cases, the collaboration activities further comprise voice conference methods. In some cases, the collaboration activities further comprise text exchange methods. In some cases, the collaboration activities further comprise virtual reality methods. In some cases, the collaboration activities are performed using helmets. In some cases, the collaboration activities are performed using by using dedicated spectacles. In some cases, the collaboration activities are performed using video conference application. In some cases, the collaboration activities are performed using audio communication application. In some cases, the interactions among players comprises methods to notify on said building progress among said users. In some cases, the interactions among players is conducted by said central system. In some cases, the interactions among users comprises further methods to conduct multiplayer sessions.

In some cases, further comprises exchanging feedback among said users. In some cases, different parts of said structure are built by different users. In some cases, further comprises methods of co-creation in which each player forms the full said structure. In some cases, the multiplayer session is performed via a video session. In some cases, the multiplayer session is performed via exchanging digital images among said players. In some cases, the multiplayer session is performed via streaming in virtual reality formats. In some cases, the multiplayer session is performed via screen sharing of said players. In some cases, further comprise receiving indications regards the construction process time in comparison with other players. In some cases, further comprise progress status sharing among players. In some cases, further comprise further comprise multiple competition types which can be conducted among player. In some cases, further comprises a knowledge sharing method. In some cases, further comprises a process designed to provide help during the building process.

In some cases, the feedback further comprises information sharing among users.

In some cases, the ability for conducting information sharing among players comprises comparison method to compare said building process among said players in accordance with the progress level of said build structure. In some cases, the ability for conducting information sharing among players further comprises comparison methods to compare said building process among said players in accordance with geographic locations. In some cases, the ability for conducting information sharing among players further comprises comparison methods to compare said building process among said players in accordance with skill level of said players. In some cases, the ability for conducting information sharing among players further comprises knowledge sharing methods to share information on said building process among said players in accordance with skill level of the players. In some cases, the ability for conducting information sharing among players further comprises knowledge sharing methods among said players in accordance with progress level of said build structure. In some cases, the ability for conducting information sharing among players further comprises knowledge sharing methods among said players in accordance with geographic locations. In some cases, ability for conducting information sharing among players further comprises knowledge sharing methods among said players in accordance with skill level of the players.

In some cases, central system is configured to recommend and facilitate knowledge sharing. In some cases, feedback is provided by other users. In some cases, feedback is provided to different players in different said feedback formats.

In some cases, at least some of the plurality of users disassemble the structure and builds a second structure using the same construction set, wherein receiving information that represents a building process of said second structure; analyzing the information on the building process of said second structure; generating a feedback on the building process of said second structure; transmitting the feedback to electronic devices of the users building the second structure.

It is another object of the invention to disclose a method operated by a computerized central system comprises receiving information from a plurality of users operating a toy construction set comprises building blocks designed for building a structure, said information represents a building process of said structure; analyzing the received information on the building process of said structure; generating a model according to a plurality of models received from the plurality of users and a predefined set of rules.

In some cases, analyzing said received information comprises methods of collecting information from multiple said players. In some cases, generating the model is performed based on an average of the plurality received models. In some cases, generating the model is performed according to predefined limitations stored in said central system. In some cases, the predefined limitations are effected by information extracted from an actual site. In some cases, further comprises generating instructions for users in order to build the new model. In some cases, the new model comprises elements from real world construction. In some cases, the new model comprises comprise architectural structures. In some cases, the new model comprises building structures (Non architectural). In some cases, the new model comprises Origami architecture (OA). In some cases, the new model comprises comprise Scale models.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF THE INVENTION

The present invention enables a plurality of users to access the central system and receive feedbacks from the central system the building process of their toy construction set. The feedback may be received or generated during or after the building process. The present invention discloses a toy based system that comprises multiple toy construction-sets designed for building structures and a computerized central system utilized for managing the building processes via guideline provisioning, information sharing and collaboration activities. The toy construction sets can be of the type of building block toys in which the building blocks have a distinctive configuration comprise protuberances and hollows on their surfaces utilized for interlocking the building blocks. In some embodiments of the present invention the building blocks may be at the type of spoke-hub toys. The spoke-hub toys comprise connections in forms of bars and wheels in which the bars can be connected to the wheel hub at the center. In some cases, toy construction sets of any type can comprise additional equipment such as dolls, toy animals, toy figures, small construction models, tiny vehicles and the like. The computerized central system may provide the players of the construction set guidelines required for building the structures. The computerized central system can also enable information sharing and collaboration activities between the computerized central system and among the players. The construction sets of the system comprise a plurality of building blocks, structural elements and game equipment utilized to build alternative structures on a dedicated surface. For clarity and consistency of the terminology, such building blocks, structural elements and game equipment will be referred to hereafter as Building Blocks.

In some exemplary embodiments of this invention, the Building Blocks of the construction sets are classified into at least two types, one type is designed to be physically connected to the dedicated surface, and other types are designed to be physically connected by the player to the upper layers of the built structure, on top of other building blocks. An exemplary case can disclose a player utilizing a construction set and use the Building Blocks in a number of alternatives. At least one type of Building Blocks can be physically connected by the player to the surface, or in some other cases to a specific location or section on the surface. The other types of Building Blocks of the construction set cannot be physically connected to the surface and in order to use them, the player is first required to place the building blocks of type number one on the surface, and then continue with the other types of the Building Blocks to build other layers or parts of the structure.

In accordance with exemplary embodiments of the present invention, the process of utilizing construction sets to build the structures is managed by a computerized system also defined as a central system designed to communicate with the computerized devices of the players. The central system is configured to receive image files or electronic video files documenting the built structures in order to analyze the status of the building processes out of the received files and then, in case it is required by any of the players, to send back guidelines on how to continue with the building process. For example, the player can utilize a computerized device to photograph an image or a video of a built structure, and then send the files to the central system. The central system receives the files from the computerized device, and analyzes the built structure. Analyzing the structure comprises identifying the building status, a phase already completed by the player, location of parts in the construction set on the built structure and the like. The central system may then provide one or more of the players with guidelines in order to proceed with the building process. Thus, the guidelines the central system produces are related to the progress level of the player and to the specific structure that was formed by the player until the point of photographing the images or the video file. The central system can also analyze files which are result of a process based on methods of automatic identification and data capture. Such a method may be Radio-frequency identification (RFID), Optical character recognition, any optical machine-readable representation based method such as Barcode and Matrix code, and the like.

The guidelines produced by the central system may be sent to the computerized device operated by the player. The computerized device operated by the players can be a mobile computerized device such as mobile phone, a tablet computer, a mobile computer, a computer and the like. The central system can also enable information sharing and collaboration activities among the players. Such an information sharing may comprise search and comparison functionalities in accordance with diverse content types and styles, geographic locations, gender, skill levels of the players and the like. Some of the collaboration activities may comprise receiving indications regards the construction process time in comparison with other players, progress status sharing among players, multiple competition types which can be conducted among players, communication and message-exchanging among players, and the like. The central system is designed to identify individual players and recognize patterns in their building processes. The patterns identified by the central system can be such as preferences to start with a particular part of the structure, preferences to start with the main structure, habit to start with peripheral and smaller parts of the structure, and the like. In some cases, the patterns identified by the central system can be also conducting the building process faster than the average, conducting the building process slower than the average by a continual process, habit to start with specific building blocks and the like. The recognized patterns can be used by the central system to link between players according to their expertise levels, the patterns of using the Building Blocks, their progress levels, and the like. For example, the central system can identify two players using similar construction sets with relatively long building process duration. The central system may identify the long building process duration by comparing the building process duration of the two identified players to other building processes stored in the central system and suggest the two players to connect and share information or help each other.

The central system is configured to collect information about the constructing properties of the players, and then encourage, recommend and facilitate collaboration activities among players with similar constructing properties. The constructing properties collected by the central system can be the height of the built structure, the building process progress level (optionally per construction time duration), the number of Building Blocks which were utilized up to a certain point of time, and the like. Such collaboration activities operated by the central system may be knowledge sharing, providing help during the building process, suggest optional directions or ideas as to the ways the construction sets are utilized, and the like. For example, in case multiple players located in different locations are playing and using similar construction sets, the central system can identify the players utilizing similar construction sets, the progress status of the individual players, and suggest connecting them for the purpose of collaboration, sharing, receiving new ideas and providing help one to each other. The central system is also designed to utilize the collected information about the individual players' patterns and the information about the used construction sets in order to suggest adjustments for the construction set content. The content adjustments may be such as adding Building Blocks to a specific construction set, removing specific Building Block from a construction set, consolidation of construction sets and the like. For example, the central system can identify a specific challenge having a high incidence rate in multiple building processes of different players. The challenge may be building a particular section in a structure, or forming two parts into one piece, and the like. The central system may suggest adding or removing specific Building Block from future construction sets in order to ease the building process and overcome the specific identified challenge. The central system can also utilize the collected information to facilitate a planning process of the construction sets' content by identifying optimal quantities of Building Blocks and their type, in a given construction set. The central system may also utilize the information collected about the individual players and their building processes to recommend purchasing of specific Building Blocks, or specific construction sets in order to foster their building process. In some cases, the central system may recommend to a particular player, or a group of players, to purchase a predefined extension kit for adding a new layer or section to an existing built structure. The predefined extension kit may comprise additional Building Blocks suitable to continue with the current building process. In some cases, the extension kit can be used to convert the current built structure to a different structure. The recommendation of a specific extension kit may result from a learning process, in which the central system associates various extension kits to various construction scenarios of the same construction set or multiple construction sets, according to predefined phases, stages, characteristics, time tables and the like.

The collaborative capabilities of the central system can be configured for providing feedback to individual players or to a group of players. In some cases, different groups of players are assigned to build different sections or portions of the same construction. For example, users 1-100 build the first floor and users 101-200 build the second floor, and users 201-300 build the garden. At the end of the building, the central system may create a new model out of the various models created by players of the three groups. Such a model created by the central system may be a representation of a proposed structure and its defined Building Blocks required to build this structure. In some cases, a model may contain the needed guidelines. The central system can utilize the information collected during the building processes, conclude it, and provide feedback to individual players or player groups in the players' chosen format. Such formats may be video, sound, text and the like. In some embodiments of the present invention the players may use equipment such as helmets, dedicated spectacles and the like when receiving or providing feedback to each other. The central system is designed to provide the feedback in the formats required for communicating with such equipment. The central system may also be designed to provide the feedback at any point of time during the building process. The feedback capability of the central system is configurable to allow customization of the feedback. The customization option of the feedback may include the timing of the feedback so it can be at the beginning of the building process, during the building process in real time, or at the end of the building process or a phase of the building process. In some cases, the feedback customization functionality of the system may also include the feedback voice in case voice is configured, the feedback text type in case text is configured, the video properties in case video is configured, the helmet type, and the like. The central system is also capable to provide different feedback formats to different players playing with the construction set concurrently. For example, in case one player configures the central system to receive feedback in text format and another player configures the central system to receive feedback in the video format, the central system manages both players and provides the feedback in accordance with each player's configuration. The feedback may be generated by the central system, or be received from another player using a feedback interface managed by the central system. One player may ask for feedback from other players and the central system may select the other players according to the phase they recently build, or players in the same country. The central system may store a list of 10 players who finished a specific phase in the specific construction set and suggest that they provide the feedback to the player who requested feedback, or other players that confronted the same challenges the player identified.

An objective of the central system is to control and manage the building processes of the players. Thus, it is designed to simultaneously receive image and electronic video files from multiple computerized devices operated by players and analyze the received images or videos in order to identify the specific Building Blocks appearing in the received files. Then, the central system may also conclude the building process state for the player that sent the image or video. Then, as a complementary part of this process, the central system analyzes the required actions for completing the building processes, individually for the player, and sends the needed guidelines to the players in order for them to proceed with the building process. The guidelines provided back to the players can contain written instructions and guidelines, messages in text formats, or visual guidelines that combine drawings, sketches, and combinations of photograph or video supplemented by drawings and the like.

In an exemplary embodiments of the present invention, the players' communication with the central system for the purpose of receiving guidelines or for collaborating with other players may require peripheral devices or accessories utilized for interpreting the messages or the dispatch received by the players. Such peripheral devices or accessories may be dedicated spectacles, dedicated screens, masks, helmets, helmets with a camera and the like. An exemplary case can be a system operating any augmented reality based processes for visualizing the guidelines for the players. The visualized guidelines sent by the central system can be viewed in any computerized device, a laptop, a tablet, a mobile computerized device and the like. An exemplary case of utilizing accessories or peripheral devices can be with a collaboration activity based on virtual reality technology. The players participating in the collaboration activity may utilize helmets or in some other cases helmets with cameras for creating, sending, receiving and interpreting the dispatches sent by the central system. In some exemplary cases, multiple players may utilize similar construction sets to build similar structures and share the progress status of the players by using the collaboration functionalities enabled by the central system. For example, multiple players build their structures and utilize similar construction sets for building similar structures. During the building process, the players can share their progress status and also assist consult, ask questions and share ideas one with each other.

The method of managing the building process by the central system may comprise dividing the building process into phases and conducting the progress within the phases, individually for each player. A phase in this method is defined as a specific and distinct part of the building process of the structure. The phase may be defined for a specific height range, element in the structure and the like. The phase may be, associated with the required guideline set for building this particular part. Exemplary case in this regard can be a player receiving guidelines from the central system that are sufficient for completing a specific phase in the building process which is a particular part of the entire structure. In order to receive additional guidelines for the next phase, the player sends an electronic video file, an image file or any file documenting the current state of the building process to the central system. Then, the central system sends the required guideline set for building the next phase to the computerized device of the player. In some cases, a structure can be divided into multiple phases and the player is required to complete one phase at the time. In some other cases the structure can contain one phase only. In some cases, multiple players build the structure at the same time, for example all 120 players begin playing on Jan. 1, 2017. They are required to send the first phase to the central system by Jan. 2, 2017 and can only begin the next phase after all players receive the guidelines for the next phase.

Another objective of the present invention is to provide planning capabilities in order to assist current and future building processes managed by the central system. The planning capabilities introduced by the central system cover diverse functionalities such as: Designing new structures, defining new phases, adjusting existing phases, and content preparing for newly planned construction sets. The purposes of the planning capabilities are to optimize the building processes for the players and to adjust the content of the construction sets according to the Building Blocks usability. In order to provide planning capabilities, the central system accumulates statistical data on the Building Blocks usability and analyzes the information for the planning processes defined in the system. The central system also provides with the ability to assemble an optimal content of construction-sets which may be received by future players in order to build the structures defined by the system, and also the ability to improve existing building processes that players are required to perform in order to build the structures.

The method of managing the building process through collaboration among players also enables interaction among players, such as informing other players on a specific accomplishment of any of the players, exchanging feedback among players, and the like. The interactions among players can utilize the central system to communicate between players and conduct multiplayer sessions. The multiplayer sessions can include co creation in which each player forms a different part of a structure and the full structure composed by the individual parts of the players can be seen via video, pictures, digital images, streaming of any visualization, virtual reality formats, and the like. For example, the players conduct a multiplayer session in which every player can build different part of a main structure. The players have their own screens in their own devices such as screen or a mobile device. The term co-creation is defined as a method in which each player builds the structure on his own, either with or without any interaction or feedback from other users during the construction phase.

The subject matter also discloses an embodiment in which the central system generates a new model as a result of analyzing multiplicity of structures built by many players. The new model may be an average of the plurality of models, for example placing a specific building block in a location most common by the many models received by the central system. The new model may result from any mathematical or logical computation using the multiplicity of structures built by many players as an input. The new model may take into consideration predefined limitations stored in a database of the central system. Such limitations may be physical constraints of a real physical location, such as a mountain or a hill or a lake located nearby a castle built by the plurality of players, and the new model generated by the central system is configured to be used to build an actual castle nearby the hill and the lake, which dictate the limitations. Another limitation for the new model may be the building blocks used to build the structure used as an input from the plurality of users of the central system. That is, the new model may be configured to be assembled by the building blocks used by the plurality of users. The new model may be defined and created by the planning unit disclosed below, or by a shelf product computer software, such as a graphical design software. The new model may visually represent a physical object, such as a building, road, rural area, land, nature landscape and the like. The new model may be a graphical computerized representation of the physical object, for example via one or more images, a three-dimensional image, a video, an illustration, or any other visualization that can be transmitted back to the users' electronic devices. The new model may be configured to be implemented in the real world, in a predefined area. The physical constraints of a real physical location may also be used to create feedback to the players in response to reviewing the model from the image or video. The feedback may include recommendation, guidance, suggested construction alternatives, and correction, in case the model interferes with the constraints.

Other constraints associated with the real world may be actual construction plans or authorizations which limit the construction of the new model created by the central system. Additional constraints may be material types used for the construction, maximal approved height and the like. The central system may generate alerts in response to identifying that the model sent in the image or video contradicts with the limitations known to the central system.

The method of creating a model and the construction set may comprise elements from real world construction, such as catalog number, Marquette, Architectural structures, Building model (non-architectural), Origamic architecture (OA), Scale model and the like, assigned to at least some of the building blocks or to pieces in the kit used by the players.

Figure 1:
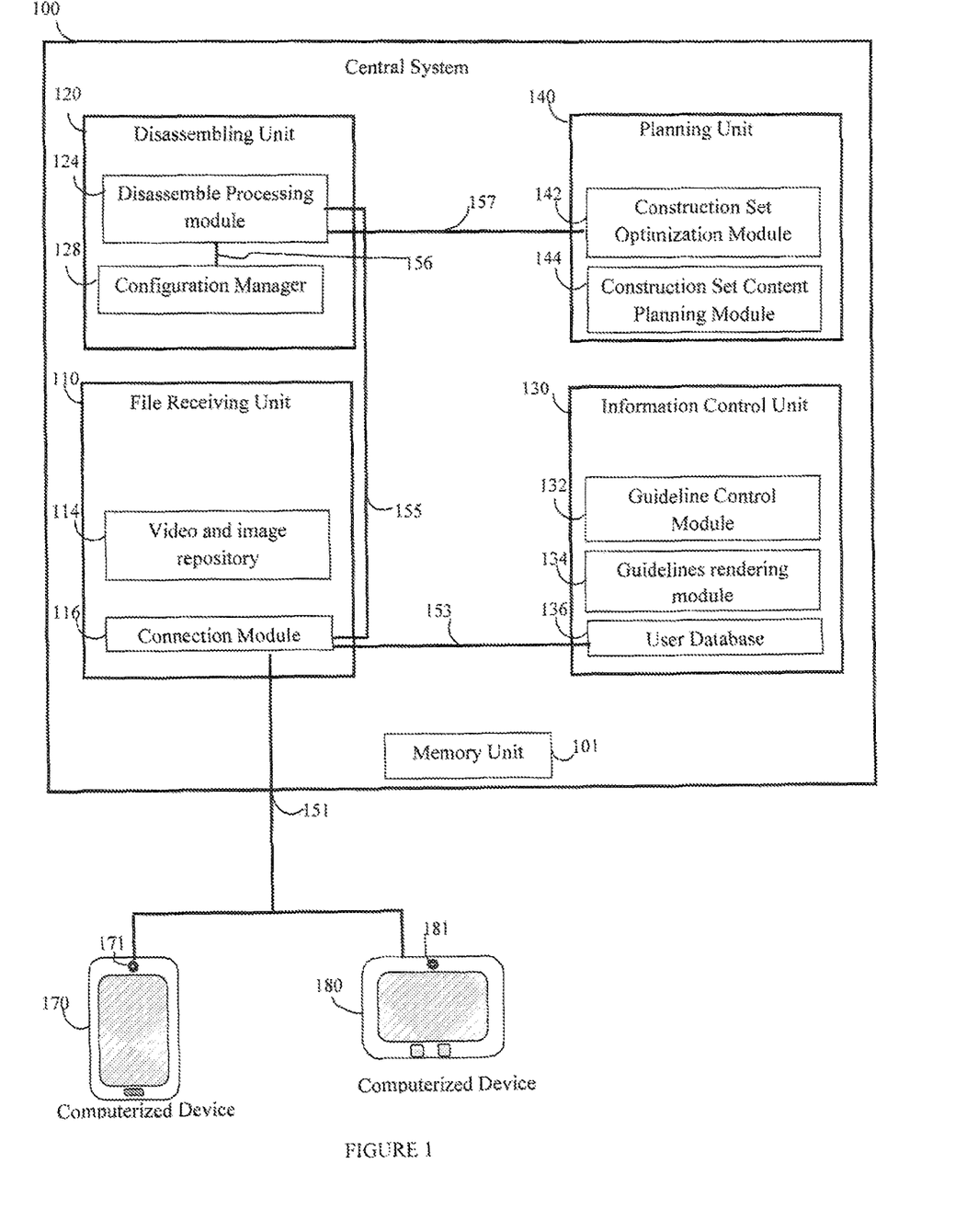
FIG. 1, discloses a functional block diagram of the central system utilized for managing the building processes of multiple players communicating through their computerized devices, according to exemplary embodiments of the present invention.

FIG. 1, discloses a functional block diagram of the central system utilized for managing the building processes of multiple players communicating through their computerized devices, according to exemplary embodiments of the present invention. The Central System 100 can be used to control the processes of building structures by receiving image or electronic video files of their built structures. For example, a player which builds the structure operates a computerized device 170, photographs the built structure with camera unit 171 that produces either a digital image or an electronic video file, then communicates with the Central System 100 through the connection process 151 and sends the files to the Central System 100. Then, the Central System 100 receives the files and analyzes the built structure. The analysis may include analyzing the progress status of each player and determining guidelines to be sent back to the player in order for the player to proceed with the building process.

The Central System 100 comprises a number of units such as File receiving unit 110, Disassembling unit 120, Planning unit 140 and Information control unit 130, in order to control and manage the building processes of the players. The functionalities of the units in the Central System 100 are as the follows: File receiving unit 110 controls the communication processes with the computerized devices and receives the files sent by the players. The File receiving unit 110 comprises a Video and image repository 114 which stores the files sent by the players and transmits them to other units in the system, in accordance with the requirements of the Central System 100. In some other cases, the Video and image repository 114 is external to the File receiving unit 110. The File receiving unit 110 also comprises a Connection module 116 that communicates with the computerized devices such as computerized device 180 and 170, via the connection process 151 and routes the communications to the corresponding modules in the Central System 100. For example, a player operating computerized device 170 photographs an electronic video file of a built structure via camera 171. Similarly, computerized device 180 comprises camera 181. Then, the player connects with the device to the Connection module 116 and uploads the files. Then, the files received by the Connection module 116 are transmitted and stored in the Video and image repository 114.

The Central System 100 also comprises a Disassembling unit 120 designed to control the processes of identifying a predefined group of the Building Blocks of the built structure, appearing in the received files, also defined as fundamental building blocks. The fundamental building blocks are registered at the Disassembling unit 120 prior to receiving the image and/or video files of the built structure. The Disassembling unit 120 may use information associated with the fundamental the Building Blocks to conclude the individual state of the building process as it is documented in the files received at the central system 100. The Disassembling unit 120 comprises a Disassembling processing module 124 that receives the files stored in the Video and images repository 114 and identifies building blocks associated with the fundamental Building Blocks in accordance with pre-define computerized procedures. Such procedures can utilize colors and shadows identifications in the image, border line definitions on the image, labels printed on the Building Blocks, computerized procedures of pattern recognition, Object recognition and the like. For example, a file stored in the Video and images repository 114 is transmitted by the Connection module 116 to the Disassembling processing module 124 via communication process 155. Then, the Disassembling processing module 124 analyzes the file by utilizing predefined procedures in order to identify the fundamental Building Blocks that appear in this file. The Disassembling unit 120 also comprises a Configuration manager 128 used to configure the Disassembling unit 120 and the computerized procedures utilized to analyze the files received from the players. For example, in case a new procedure or new settings are required to be added or configured in the Disassembling unit 120, the Configuration manager 128 is utilized to connect to the Disassembling processing module 124 via communication process 156 in order to add the configurations and settings. In some cases, some of the procedures utilized by the Disassembling processing module 124 may be manual procedures performed by a person, not in an automatically manner. In this case, the manual procedures are managed through the Configuration manager 128.

The Central System 100 also comprises an Information control unit 130 utilized to manage the information about the central system's processes, the guidelines and information about the players. The Information control unit 130 comprises a User database 136 that contains a list of the players which are identified by the central system 100 and the progress status of these players. For example, a player connects with a computerized device to the Central System 100 and submits files in accordance with the system requirements. Then, the Connection module 116 transmits the files to the Disassembling process module 124 via connection process 155 in order to analyze the progress level of this particular player. At the end of this process the connection module 116 receives the progress status of the player and stores it in the User database 136.

The Information control unit 130 comprises a Guideline control module 132 used to store the guidelines, the phase definitions and the information needed to build up new guideline sets for the players. The Information control unit 130 also comprises a Guideline rendering module 134 which is utilized to produce the guidelines for the players. For example, files of a player are transmitted to the Disassembling processing module 124, being analyzed, the status is identified and the User database 136 is updated with the status. Then, the Guideline rendering module 134 receives the information form the User database 136, utilizes the Guideline control module 132 to receive the needed content required for the new guideline set and produces the guideline set for that particular player according to a predefined set of rules stored in the central system 100. Then, the Guideline rendering module 134 transmits the new guideline set to the Connection module 116 in order to transmit it to the player.

The Central System 100 also comprises a Planning unit 140 utilized to manage and plan potential models that can be built using the construction sets. The Planning unit 140 may be configured to plan new structures, define new phases or adjust existing phases of current or future building processes, and plan new elements included in construction sets required for building the planned structures. The Planning unit 140 may be configured to generate a new model according to analysis of many constructions created by the players communicating with the central system. for example, the new model may visually represent a preferred location for a specific building block, which is required to be located at a place most popular among the players, or at a location calculated as an average or a mere average out of the many models collected by the central system 100. The new model is created as a computerized representation of a physical object. The new model may be created by the planning unit 140. The new model is created may be limited by one or more parameters, such as natural parameters or real limitations in case the new model should fit to an actual location. The new model is created may be limited by the properties of the building blocks used by the plurality of players during their building process. The Planning unit 140 comprises a Construction Set Optimization Module 142 which analyzes the content of the constriction set's according to the files received from the players' computerized devices, for example player Building Blocks usage. The information about the Building Blocks usability is accumulated by the Construction Set Optimization Module 142 which communicates with the Disassemble process unit 124 via communication process 157 and receives the required statistical data. The data types being accumulated may be frequency of Building Blocks usage, building process states that required assistance, cumbersome structures that required lengthy building process, repeated incidents or events defined as negative caused by players and the like. Planning unit 140 also comprises a Construction Set Content Planning Module 144 configured to utilize the statistics, analyze it and perform the planning processes of the Central System 100. The Construction Set Content Planning Module 144 utilizes the data provided by Construction Set Optimization Module 142 and utilizes heuristic processes and in some cases manual process for identifying the optimal content of a construction set.

The Central System 100 also comprises a Memory unit 101 utilized by all units for their internal processes. The memory unit 101 can be an independent physical memory unit, or an allocated memory provided by a hosting environment, a server, a computerized system, a server farm or a personal computer. In some cases, any of the units in the Central System 100 may comprise an independent memory allocation which can be either an independent physical memory unit, or a shared memory managed by the Central System 100 and allocated from the Memory unit 101.

Figure 2:
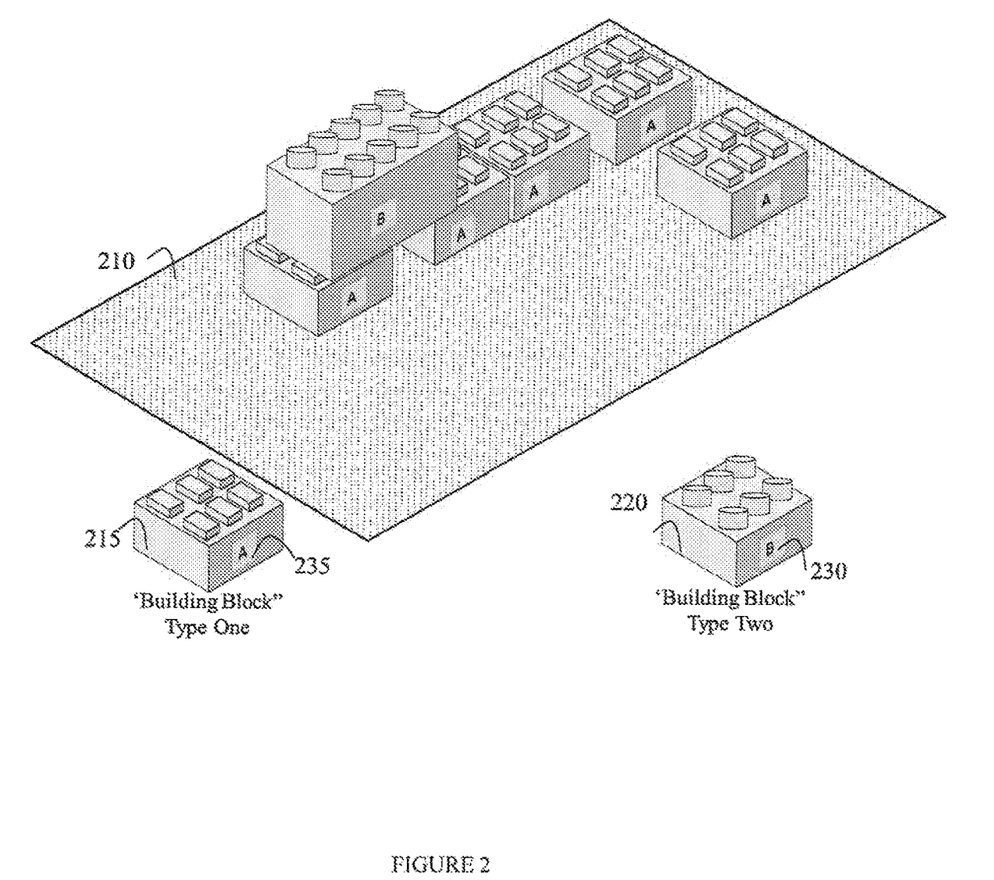
FIG. 2, demonstrates a construction-set used by the players, according to exemplary embodiments of the present invention.

FIG. 2, demonstrates a construction-set used by the players, according to exemplary embodiments of the present invention. The construction-set comprises a dedicated surface 210 designed so that the Building Blocks can connect to it. In the embodiment of the present invention shown in FIG. 2, the Building Blocks are classified into two types, demonstrated in Building Block type one 215 and in Building Block type two 220. Thus, type one 215 is designed to be physically connected to the dedicated surface 210, or in some cases to specific locations of it, and type two 220 is designed to be physically connected by the player, to upper layers of type one 215. For example, a player utilizing a construction set in a building process to build a structure. The player may be required to complete the corresponding parts of type one first, and then with type two Building Blocks, to proceed building the other layers or parts of the structure. In some other cases the construction set may contain more than two types of Building Blocks. In these cases, the additional types such as type three, type four and so on, introduce the same functionality of being capable to physically connect to the upper layers of the structure and be attached to any of the previous layers, in similar manner as type one and type two are functioning. The Building Blocks of the construction set may contain printed labels as shown in Building Block type one 215 and the printed label 235. The label 235 can be used by the central system in the analysis process which identifies the specific Building Blocks in an image or an electronic video file sent by a player. Similar, the Building Block type two 220 has the label 230 for the analysis process similar to process for Building Block type one 215. In some cases, the central system may utilize a computerized procedures based on Optical character recognition known as OCR for recognizing the signs printed on the labels. In some cases, the labels may comprise any optical machine-readable representation based print such as Barcode or Matrix code. In some other cases, an RFID, or NFC may be utilized to identify the building blocks, as the RFID is attached or glued to the building block.

Figure 3:
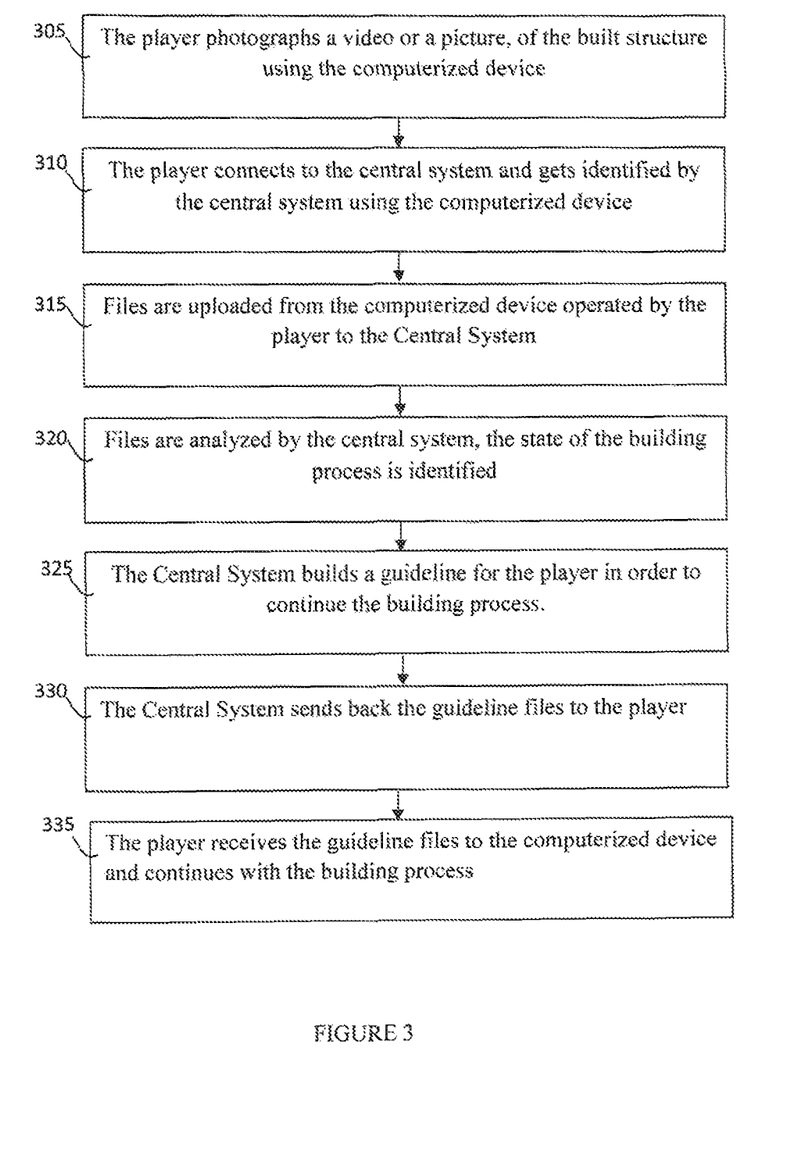
FIG. 3 discloses a method of sending an electronic video file or an image file to the central system, and receiving back the guidelines to proceed with the building process, according to exemplary embodiments of the present invention.

FIG. 3 discloses a method of sending an electronic video file or an image file to the central system, and receiving back the guidelines to proceed with the building process, according to exemplary embodiments of the present invention. In step 305 a player building a structure operates a computerized device with a digital camera and documents the state of the built structure by photographing it as a video or as an image. The computerized device utilized by the player can be a mobile device, a laptop, a tablet computer or a personal computer connected to a digital camera that can photograph digital images or electronic video and connect to the internet in order to send and receive digital content from any computerized system.

Step 310 discloses a process of connecting to the central system via the computerized device operated by the player. The player connects to the internet and then communicates with the central system in order to send the files. The player may go through an identification process first, in order for the system to associate the player with any content, information or data related to the player's activities and held by the central system. In step 315, the player uploads the files from the computerized device to the central system in order to start the analysis process by the system. Then in step 320, the central system receives the digital files and analyses them in order to identify the specific Building Blocks documented in the files and to conclude the state of the building process. In some cases, the process of identifying the specific Building Blocks utilized some computerized procedures implementing methods from the field of Image analysis. Such methods can be pattern recognition, object recognition and the like. In other cases, these methods can combine utilization of labels printed or sometime coined on Building Block. In step 330, the central system builds up a new guideline set to the player, after completing the analysis process of step 325 and identifying the specific state of the building process. In step 335, the player receives the guidelines files to the computerized device from the Central System and utilizes them to continue with the building process. Such guidelines generated and provided by the central system may comprise written instructions and guidelines, messages in text formats, or in some cases visual guidelines that combine drawings, sketches, and combinations of images or video supplemented by drawing and drawings, augmented reality based guidelines, and the like.

Figure 4:
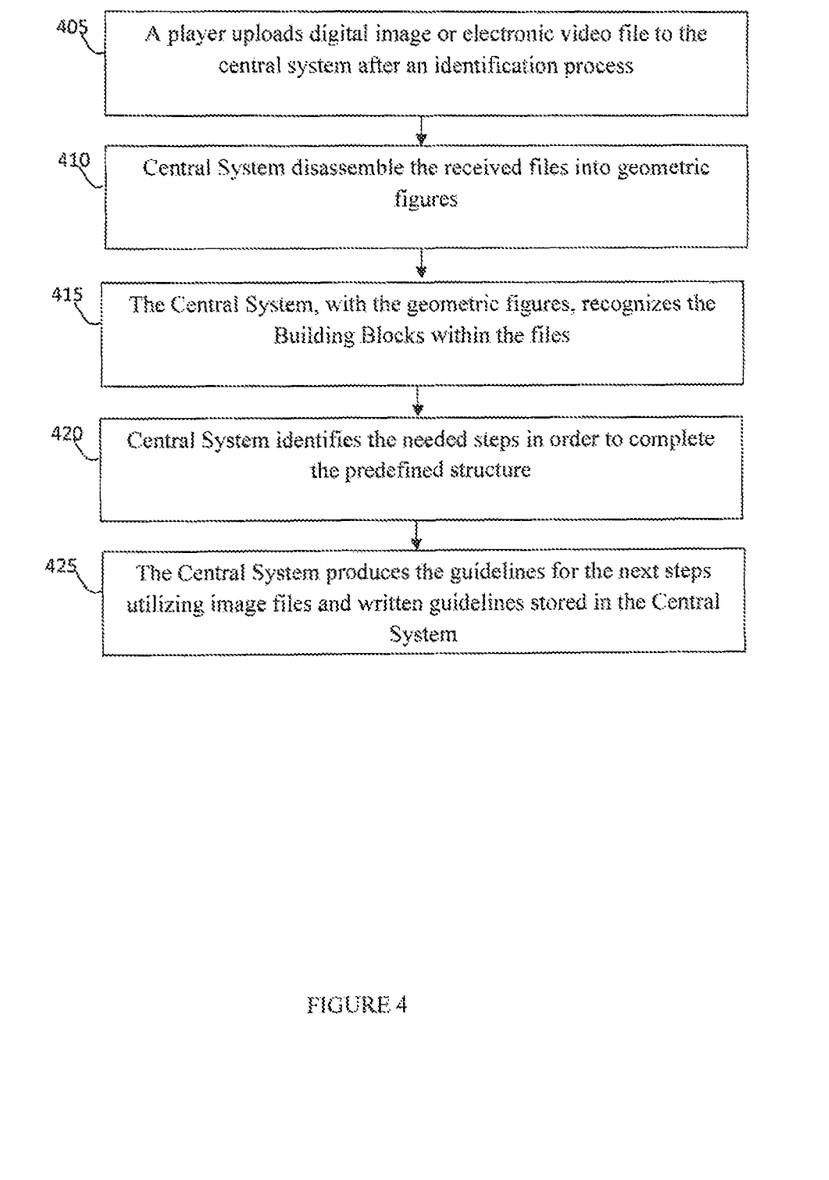
FIG. 4 discloses a method of analyzing an electronic video file or an image file sent by a player, according to exemplary embodiments of the present invention.

FIG. 4 discloses a method of analyzing an electronic video file or an image file sent by a player, according to exemplary embodiments of the present invention. Step 405 discloses the process of receiving the image or the video file from an identified player. First, the player may go through an identification process and then upload an image file or an electronic video files in order to launch the process. Then, the central system recognizes the player, accepts the files and associates the player with the records in the system. Then in step 410, the Central System utilizes computerized procedures to identify geometric figures such as circles, rectangles, triangles and the like, within the received files. Then, in step 415, the central system analyzes the geometric figures identified in step 410, and recognizes the Building Block associated with the geometric figure. The relation between the geometric figure and the building blocks is known to the central system prior to receiving the files from the players. The analysis process that recognizes the Building Blocks is also configured to use labels printed on the surface of the Building Block. Then in step 420, the central system utilizes the Building Blocks recognized in step 415 to identify the specific state of the building process of the player and then in step 425, the central system identifies the required steps for completing the building process, and creates a guideline set to the player. Then, in step 430, based on the missing steps identified in step 425, the central system creates a guideline set for completing the building process and sends it to the player.

Figure 5:
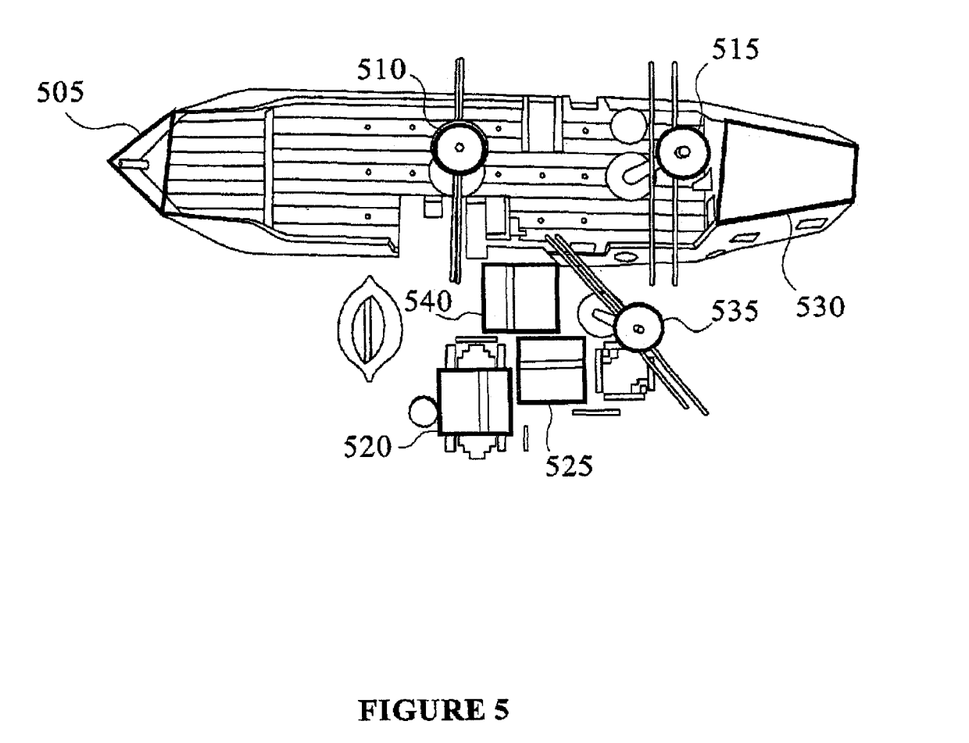
FIG. 5 demonstrates how a digital image is being analyzed for identifying geometric figures, according to exemplary embodiments of the present invention.

FIG. 5 demonstrates how a digital image is being analyzed for identifying geometric figures, according to exemplary embodiments of the present invention. The photos in FIG. 5 is a top view of a ship during its building process and geometric figures identified within the image files. The image is a photo sent by a player and received at the central system. The geometric figures in the photo are marked as part of the analysis process conducted by the central system, in such exemplary case. In the image, the triangle 505 and the trapezoid 530 are colored in yellow and used to identify the rear side and the front side of a ship, which are Building Blocks existing in the construction set of the ship. The cycles 510, 515 and 535 used to identify the poles of a ship, which are Building Blocks existing in the construction set of the ship. The rectangles 520, 540 and 525 marked with orange lines and used to identify roofs of buildings existing in the vicinity of the ship, which are Building Blocks existing in the construction set of the ship.

Figure 6:
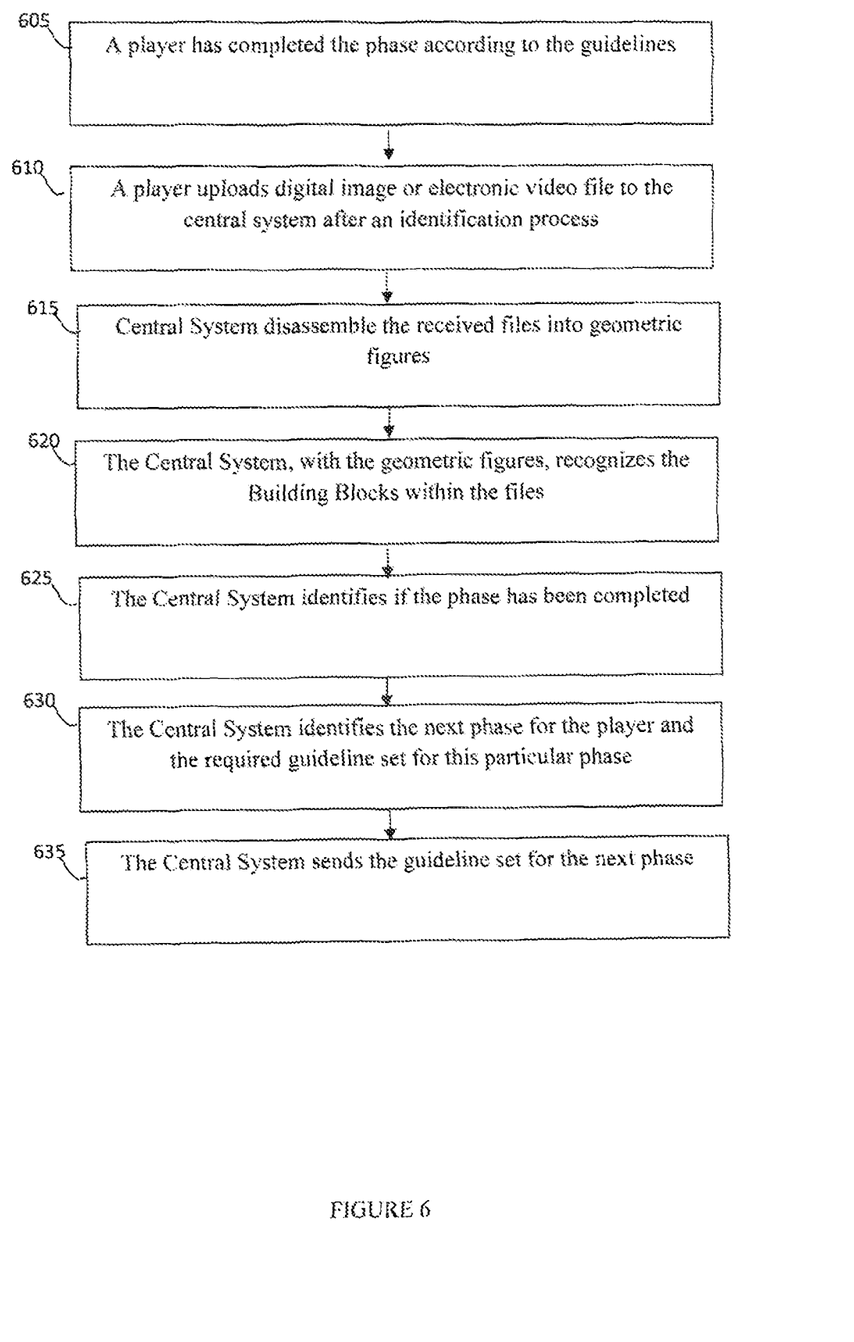
FIG. 6 demonstrates a method of progressing in phases at the building process, according to exemplary embodiments of the present invention.

FIG. 6 demonstrates a method of progressing in phases at the building process, according to exemplary embodiments of the present invention. Step 605 demonstrates the state of a player that has completed building a phase according to the guideline set the player has received previously. Step 610 discloses the process of receiving the image or the video file which were sent by the player, and received by the central system. In this step, the player may go through an identification process and then upload an image file or an electronic video files documenting the state of the building process. Then, the central system recognizes the player, accepts the files and associates the player with the relevant records in the system. Such records can be the full details of the player, the previous state of the building process statistic on Building Blocks usability, and the like. Then, in step 615, the Central System utilizes computerized procedures to identify geometric figures such as circles, rectangles, triangles and the like, within the received files. Then, in step 620, the central system analyzes the geometric figures identified in step 615, and recognizes the Building Block each geometric figure represents, as disclosed in FIG. 5. In some cases, this analysis process that recognizes the Building Blocks is also configured to use labels printed on the surface of the Building Block. Then in step 625, the central system utilizes the Building Blocks recognized in step 620 to prove the completion of the phase. In step 625, the central system identifies the next phase the player should preform and sends the guideline set to the player in order to build the next phase.

Step 630 discloses the central system identifies the next phase the player is eligible to receive and the required guideline set for this particular phase. Then in step 635, the central system sends the guideline set for the particular player, in order for the player to start build it.

Figure 7:
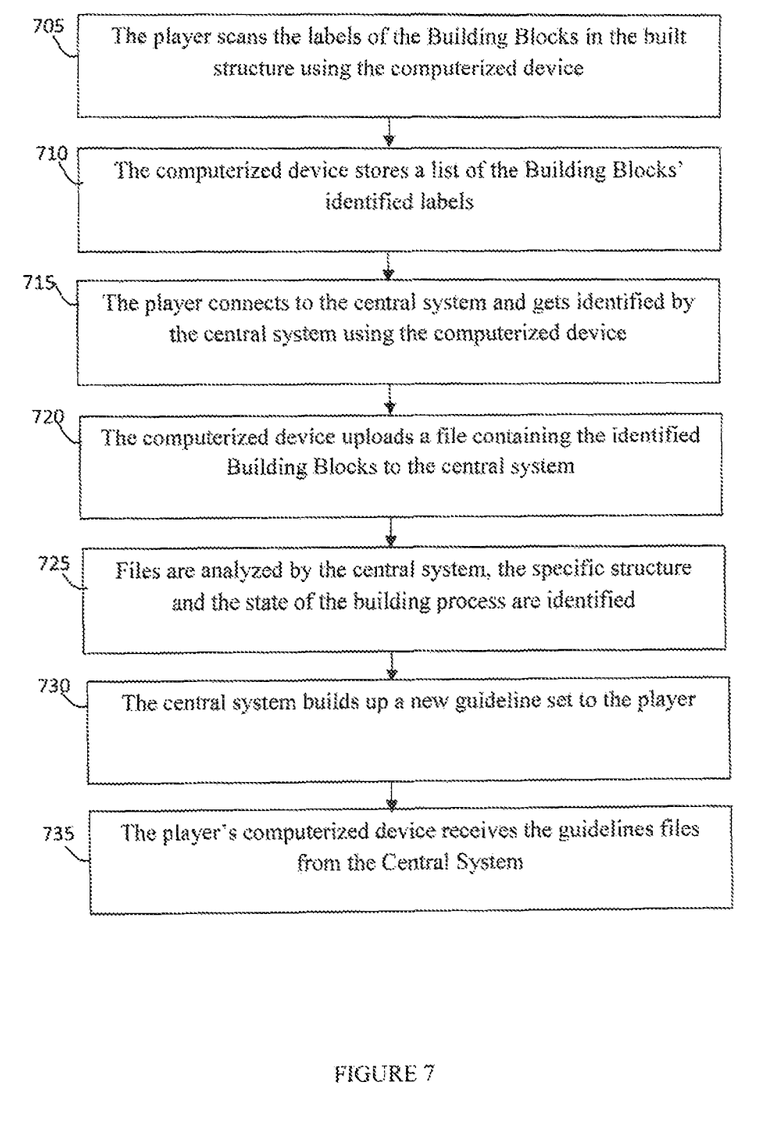
FIG. 7 discloses a method of transferring a file which is a result of a process based on automatic identification and data capture method, to the central system, and receiving back the guidelines to proceed with the building process, according to exemplary embodiments of the present invention.

FIG. 7 discloses a method of transferring a file which is a result of a process based on automatic identification and data capture method, to the central system, and receiving back the guidelines to proceed with the building process, according to exemplary embodiments of the present invention. In step 705 a player building a structure operates a computerized device that is capable of barcode scanning, or in some cases Matrix code and scans the Building Blocks labels of the built structure. The computerized device utilized by the player can be a mobile device, a laptop, a tablet computer or a personal computer equipped for preforming the scan and connect to the internet in order to send and received digital content from any computerized system. In step 710 the computerized device stores the file that contains the list of the identified Building Block, the specific surface used in the structure. Step 715 discloses a process of connecting to the central system via the computerized device operated by the player. The player connects to the internet and then communicates with the central system in order to send the file. The player may go through an identification process first, in order for the system to associate the player with any content, information or data related to the player's activities and held by the central system. In step 720, the player uploads the files from the computerized device to the central system in order to start the analysis process by the system. Then in step 725, the central system receives the file and analyses it in order to identify the specific Building Blocks documented in the files and to conclude the state of the building process. In step 730, the central system builds up a new guideline set to the player, after completing the analysis process of step 725 and identifying the specific state of the building process. In step 735, the player receives the guidelines files to the computerized device from the Central System and utilizes them to continue with the building process. Such guidelines generated and provided by the central system may comprise written instructions and guidelines, messages in text formats, or in some cases visual guidelines that combine drawings, sketches, and combinations of images or video supplemented by drawing and drawings, augmented reality based guidelines, and the like.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A computerized central system comprising a processor configured to execute a set of rules, comprising:

receiving media files from multiple computerized devices operated by a plurality of users operating a toy construction set, the toy constructions set is a physical object that comprises building blocks designed for building a structure that is a physical structure, said media files represent a building process of said structure, wherein at least one user of the plurality of users is assigned to build a first part of the structure and a second user of the plurality of users is assigned to build a second part of the structure;

analyzing the media files on the building process of said structure;

generating a feedback on the building process of said structure according to the media files received from the devices operated by the plurality of users;

transmitting the feedback to the multiple electronic devices of the plurality of users building the structure;

identifying construction properties of the plurality of users, the construction properties of the plurality of users represents the building process of the plurality of users, wherein the construction properties of the plurality of users comprise a height of a built structure that is built by the plurality of users; and facilitating collaboration activities between users among said plurality of users having similar construction properties, wherein the collaborative activities comprise transmitting, by the computerized central system, at least a portion of the media files to one or more of the electronic devices.

2. The system of claim 1, wherein analyzing said received media files comprises identifying a progress status of said building process.

3. The system of claim 1, wherein said building process comprises two or more phases.

4. The system of claim 1, wherein analyzing said received information comprises identifying the location of said building block on said structure and generating the feedback according to the identified location.

5. The system of claim 1, wherein analyzing said received information comprises comparing the progress levels of the plurality of users.

6. The system of claim 1, wherein the feedback comprises guidelines on how to continue with the building process.

7. The system of claim 1, wherein the feedback is related to a progress level of the plurality of users and to a specific structure formed by a player until the point of receiving said feedback.

8. The system of claim 1, wherein the feedback further comprises identifying patterns in the building processes of the plurality of users and linking between users of the plurality of users having similar patterns in the building processes.

9. The system of claim 1, wherein the system is configured to facilitate collaboration activities using virtual reality.

10. The system of claim 1, wherein the system is configured to facilitate collaboration activities using augmented reality.

11. The system of claim 1, wherein the system is configured to facilitate notifying on said building progress among said plurality of users.

12. The system of claim 1, wherein the system is configured to facilitate conducting multiplayer sessions.

13. The system of claim 12, further comprises exchanging feedback among the plurality of users.

14. The system of claim 12, wherein the multiplayer session is performed via a video session.

15. The system of claim 12, wherein the multiplayer session is performed via exchanging digital images among said plurality of users.

16. The system of claim 12, further comprising receiving indications regarding the building process time in comparison with other plurality of users.

17. The system of claim 12, wherein the system is configured to facilitate multiple types of competition among the plurality of users.

18. The system of claim 1, wherein the system is configured to facilitate a comparison between said building process among the plurality of users in accordance with the progress level of said build structure.

19. A computerized central system comprising a processor configured to execute a set of rules, comprising:

receiving media files from multiple computerized devices operated by a plurality of users operating a toy construction set, the toy constructions set is a physical object that comprises building blocks designed for building a structure that is a physical structure, said media files represent a building process of said structure, wherein at least one user of the plurality of users is assigned to build a first part of the structure and a second user of the plurality of users is assigned to build a second part of the structure;

analyzing the media files on the building process of said structure;

generating a feedback on the building process of said structure according to the media files received from the devices operated by the plurality of users;

transmitting the feedback to the multiple electronic devices of the plurality of users building the structure;

identifying construction properties of the plurality of users, the construction properties of the plurality of users represents the building process of the plurality of users, and facilitating collaboration activities between users among said plurality of users having similar construction properties, wherein the collaborative activities comprise transmitting, by the computerized central system, at least a portion of the media files to one or more of the electronic devices, wherein the construction properties of the plurality of users comprise a number of building blocks which were utilized up to a certain point of time by each of the plurality of users.

* * * * *